United States Patent [19]

Chang

[11] 4,082,634

[45] Apr. 4, 1978

[54] METHOD OF CURING B-STAGE POLYURETHANES

[75] Inventor: Wen-Hsuan Chang, Gibsonia, Pa.

[73] Assignee: PPG Industries, Inc., Pittsburgh, Pa.

[21] Appl. No.: 307,270

[22] Filed: Nov. 14, 1972

Related U.S. Application Data

[63] Continuation-in-part of Ser. No. 141,434, May 7, 1971, abandoned, which is a continuation-in-part of Ser. No. 746,740, Jul. 23, 1968, abandoned.

[51] Int. Cl.$^2$ .................................................. C08F 8/00
[52] U.S. Cl. ............................ 204/159.15; 96/115 P; 204/159.14; 260/859 R; 427/36; 427/38; 427/44; 427/54; 428/423; 428/913
[58] Field of Search ...................... 204/159.15, 159.14; 260/859 R; 96/115 P

[56] References Cited

U.S. PATENT DOCUMENTS

| | | | |
|---|---|---|---|
| 2,921,006 | 1/1960 | Schmitz et al. | 204/159.15 |
| 3,495,987 | 2/1970 | Moore | 96/115 P |
| 3,509,234 | 4/1970 | Burlant et al. | 260/859 |
| 3,651,021 | 3/1972 | Kincaid et al. | 260/77.5 CR |
| 3,700,643 | 11/1972 | Smith et al. | 204/159.14 |

*Primary Examiner*—Murray Tillman
*Assistant Examiner*—Thurman K. Page
*Attorney, Agent, or Firm*—George D. Morris; Carl T. Severini

[57] ABSTRACT

B-stage polyurethanes comprising the reaction product of at least one hydroxyl-containing ester having a terminal acrylyl or alpha-substituted acrylyl group, an organic diisocyanate and a polyester polyol, are cured by ionizing radiation or actinic light to provide hard, thermoset polyurethanes. The composition may include one or more copolymerizable ethylenic monomers. The method is useful to provide films, coatings and impregnated materials of highly desirable properties.

11 Claims, No Drawings

METHOD OF CURING B-STAGE POLYURETHANES

CROSS-REFERENCE TO RELATED APPLICATIONS

This application is a continuation-in-part of application Ser. No. 141,434, filed May 7, 1971, which is a continuation-in-part of Ser. No. 746,740, filed July 23, 1968, both now abandoned.

BACKGROUND OF THE INVENTION

It has been known for some time that certain types of radiation, such as ionizing radiation and actinic light, can be used to effect free radical-induced polymerization of certain materials. However, because the energy utilization in such polymerization methods is quite low, and because the response of materials which one would expect to be useful in such methods varies and often is unexpectedly so low as to make the method impractical, little interest has been shown in polymerization by means of such radiation until relatively recently.

The types of materials which are theoretically polymerizable by means of radiation are limited to those which react by a free radical-induced mechanism, and thus this process is not applicable to materials which form by condensation reactions. The production of many highly useful polymeric materials, such as polyurethanes, polyamides, aminoplast resins and the like, therefore ordinarily cannot be carried out by means of these processes. For the most part, polymerization using radiation involves liquid monomeric species having polymerizable ethylenic groups and which have a suitable viscosity in the absence of any solvent.

BRIEF SUMMARY OF THE INVENTION

It has now been found that certain B-stage polyurethanes as above can be cured successfully by ionizing radiation or actinic light. Using such radiation, these B-stage polyurethanes cure, either alone or in combination with one or more ethylenically unsaturated monomers, to form highly useful films, coatings, impregnated materials and the like, as well as laminates with radiation permeable laminae. The products have the highly desirable properties which are characteristic of cured polyurethanes, including excellent hardness, durability, abrasion resistance, chemical resistance and similar properties.

The curable (B-stage) polyurethanes which are useful in this invention comprise reaction products of A. a polyester polyol B. an organic diisocyanate, and C. a hydroxyl-containing ester having a terminal acrylyl or alpha-substituted acrylyl group.

DETAILED DESCRIPTION OF THE INVENTION

The B-stage polyurethane compositions which are cured in accordance with the present invention comprise the reaction product of three essential components, namely, one or more hydroxyl-containing esters having a terminal acrylyl or alpha-substituted acrylyl group, an organic diisocyanate, and a polyester polyol.

The hydroxyl-containing ester component can be any monomeric ester or polyester containing at least one hydroxyl group and an acrylyl or substituted acrylyl group. Esters containing acrylyl groups are preferred over those with substituted acrylyl groups, such as methacrylyl compounds, because they cure more readily and at more easily achieved conditions. Preferred esters are hydroxyalkyl esters of acrylic acid, and especially the monoesters of ethylene glycol and 1,2-propylene glycol, i.e., hydroxyethyl acrylate and hydroxypropyl acrylate. However, there may also be employed similar esters of other unsaturated acids, such as methacrylic acid, alpha-chloroacrylic acid, ethacrylic acid, crotonic acid and similar acids having, for example, up to about 6 carbon atoms, as well as esters containing other hydroxyalkyl radicals, such as hydroxybutyl esters and hydroxylauryl esters.

Also useful are substituted hydroxyalkyl esters, such as 1-acryloxy-3-phenoxy-2propanol, which can be produced by reacting phenyl glycidyl ether with acrylic acid. Other compounds of this type and other substituted hydroxyalkyl esters, such as, for example, hydroxyalkyl acryloxyalkyl phthalates or maleates, can also be utilized.

Hydroxyl-containing polyesters having terminal acrylyl or alpha-substituted acrylyl groups are also included. These can be produced, for example, by reacting one mole of acrylic or methacrylic acid with two moles of a dicarboxylic acid, such as adipic acid, azelaic acid or other such acid, and three moles of a diol such as ethylene glycol, 1,4-butanediol, or the like. Similar polyesters can be produced using other such reactants in varying proportions, so long as an ungelled product having residual hydroxyl and acrylyl or alpha-substituted acrylyl groups is provided.

A preferred class of hydroxyl-containing esters are those produced by reacting acrylic or methacrylic acid with an epoxy compound, such as alkylene oxides (e.g. ethylene oxide and propylene oxide), the glycidyl ethers of polyhydric compounds such as Bisphenol A, or other compounds of various types having one or more oxirane groups.

The organic diisocyanate which is reacted with the ester component can be essentially any diisocyanate, e.g., hydrocarbon or substituted hydrocarbon diisocyanates and isocyanato-terminated adducts of polyols. Many such organic diisocyanates are known in the art.

Among the organic diisocyanates which can be employed are arylene diisocyanates, such as p-phenylene diisocyanate, diphenyl diisocyanate and the like; alkarylene diisocyanates, such as toluene diisocyanate, 3,3'-dimethyl-4,4'-biphenylene diisocyanate and the like; alkylene diisocyanates, for example, ethylene diisocyanate, 1,4-tetramethylene diisocyanate, hexamethylene diisocyanate, and 2,2,4-trimethylhexane 1,6-diisocyanate; aralkylene diisocyanates, such as methylenebis(phenyl isocyanate); and alicyclic diisocyanates, for example, isophorone diisocyanate and methylcyclohexyl diisocyanate.

Other diisocyanates that can be employed are isocyanate-terminated adducts of diols such as ethylene glycol, 1,4-butylene glycol, polyoxyalkylene glycols, etc. These are formed by reacting two moles of a diisocyanate, such as those mentioned above, with one mole of a diol.

One preferred class of organic diisocyanates comprises prepolymers produced from an organic diisocyanate, such as toluene diisocyanate, with a poly(oxypolymethylene)glycol. Representative poly(oxypolymethylene) glycols of this group contain oxypolymethylene groups in which a linear chain of from about 3 to about 6 carbon atoms separate each adjacent pair of oxygen atoms. Included, for example, are poly- (oxytetramethylene) glycols. Other polyether glycols, such as poly(oxypentamethylene) glycols and poly(oxyhexamethylene) glycols can also be used, but are usually less desirable as a class, as are branched carbon chain compounds. It is desirable that the poly(oxypolymethylene) glycol have a molecular weight between about 100 and about 4000, although the optimum molecular weight varies with the particular system and the intended use for the product.

Other useful diisocyanates include isocyanato-terminated adducts produced from polyester polyols, such as adducts of various saturated and unsaturated polyester polyols made from esterification of polyols and dibasic acids and containing unreacted hydroxyl groups, e.g., the reaction product of toluene diisocyanate with a polyester formed from propylene glycol and adipic acid. Such polyester adducts are well-known and are utilized in the manufacture of conventional types of polyurethane products.

In many cases, more than one diisocyanate is employed; for example, toluene diisocyanate or other low molecular weight diisocyanate is often added along with an isocyanato-terminated prepolymer, or several prepolymers of varying molecular weights are used. This permits formulation of the product to provide a desired level of hardness, flexibility and similar properties.

The polyester polyol which is employed can be any polymeric polyol having an average of more than one ester group and more than one hydroxyl group and not more than about 8 hydroxyls per molecule. Useful polyester polyols include those produced by reacting a polycarboxylic acid with a polyol such as ethylene glycol, 1,4-butanediol, 1,6-hexanediol and other alkylene glycols, glycerine, trimethylolpropane, sorbitol, pentaerythritol, cyclohexane dimethanol, hydrogenated Bisphenol A, and the like, as well as polymeric polyols, including polyether polyols such as poly(oxopolymethylene) glycols. The acid used may be an aliphatic acid, such as adipic acid, an aromatic acid such as phathalic or isophthalic acid, or an unsaturated acid such as maleic or fumaric acid. In many cases a mixture of acids and/or a mixture of polyols is utilized.

One preferred class of polyols are phosphorus-containing polyester polyols. These provide a degree of fire-retardance in the final product which can be particularly useful. Various types of phosphorus polyols as known in the art can be used.

Optional ingredients which can be included in the over-all composition include chain transfer agents, such as mercaptan; small amounts of monohydric alcohols, including in some cases a hydroxyalkyl ester of a saturated carboxylic acid; and other additives such as inhibitors, antioxidants, stabilizers and the like.

The components are combined in proportions chosen so as to avoid gelation of the product, i.e., to provide an ungelled product which is substantially linear of low molecular weight. The proportions employed depend upon considerations well known to those in the art, such as the functionality of the particular reactants and their reactivity with each other. The number of isocyanate groups should not be greater than the total number of hydroxyl groups present; usually the proportion of diisocyanate is such that the number of isocyanate groups is less than the number of hydroxyl groups. The diisocyanate reacts in part with the polyester polyol and in part with the hydroxyl groups of the ester; in some cases, the isocyanate may react with excess hydroxyl groups of the polyester to provide a coupled product.

The reaction to produce the B-stage polyurethane takes place upon admixture of the components, although moderate heating can be utilized in order to induce faster reaction. In some instances, as when an aliphatic diisocyanate is employed, it is desirable to promote the urethane-forming reaction with a catalyst, such as dibutyltin dilaurate or zinc octoate. Temperatures below about 150° C. are ordinarily employed. The product can be easily handled and is essentially thermoplastic until cured.

The exact structure of the product is not known with certainty; a complex mixture is often obtained, although the over-all properties are as described herein. It is believed that the curable polyurethanes produced in the foregoing manner have as the major resinous component a product corresponding generally to the average formula

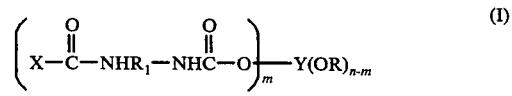

In the above formula, X is an organic radical formed by removing a hydroxyl hydrogen atom from an ester containing an acrylyl or alpha-substituted acrylyl group and at least one hydroxyl group. The radical represented by X is the residue of the ester component described above after reaction of the hydroxyl group, and thus can be derived from any of the monomeric esters of polyesters described.

In the preferred embodiment in which the ester employed is a hydroxyalkyl ester of an acrylic acid, the B-state product has the average formula

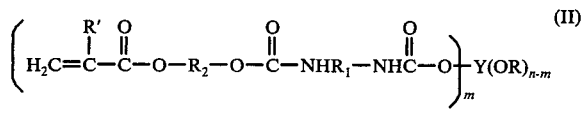

where R' is hydrogen or lower alkyl, e.g., methyl, and $R_2$ is an alkylene or substituted alkylene of at least 2 carbon atoms, derived from the hydroxyalkyl group of the ester. The group represented by $R_2$ may be an alkylene group substituted with alkoxy, aryloxy, oxyalkylene and other such groups.

In the embodiment in which an acrylyl-terminated hydroxyl-containing polyester is utilized, the B-stage product has the formula

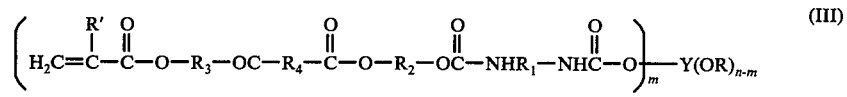

where $R_3$ is an alkylene or oxyalkylene group such as those represented by $R_2$, and $R_4$ is a divalent organic radical, such as alkylene, arylene or alkenylene, or a polyester moiety. B-stage products of this type are produced, for example, by employing as the ester component a reaction product of one mole of hydroxyethyl acrylate, one mole of phthalic anhydride, and one to two moles of ethylene oxide, or the product from the reaction of one mole of methacrylic acid, two moles of adipic acid and three moles of 1,6-hexanediol.

The group represented by $R_1$ in the above formulas is derived from the diisocyanate and thus can be essentially any divalent organic radical. For example, $R_1$ can be arylene, alkylene, alicyclic, oxyalkylene, etc., including halogen or other substituted groups, depending upon the organic diisocyanate employed, as illustrated by the varied types of diisocyanates mentioned above. In many cases the polyurethane is chain-extended and contains urethane linkages.

The radical represented by Y is the residue of the polyester polyol without the hydroxyl groups and thus also can be of widely varying structures. As indicated by the polyols described above, Y can be monomeric or polymeric and can be of essentially any organic structure which can have hydroxyl groups attached thereto.

As described above, Y is derived from a polyol having $n$ hydroxyl groups, where $n$ is a number greater than 1 and up to about 8. Since the formula given is an average formula, and a mixture of polyols can be utilized, $n$ can be a whole or fractional number.

In producing the curable polyurethane, the number of polyurethane groups terminated with radicals containing acrylyl or alpha-substituted acrylyl groups is greater than one but not more than about four (designated by $m$). The remaining hydroxyls of the polyol, if any are represented by –OR, where R is hydrogen if the hydroxyls remain unreacted or a urethane-containing radical where the hydroxyl is reacted with a diisocyanate, which may be the same as or different than that used to produce X-terminated groups. The groups represented by R, however, do not contain an acrylyl or substituted acrylyl as does that represented by X.

In accordance with the present invention, the B-stage product described above is cured by subjecting a thin layer of the polyurethane composition to ionizing radiation or actinic light. Ionizing radiation, as that term is used herein, means radiation having energy sufficient to produce ions or to break chemical bonds. Such radiation can be produced by various means known in the art. It is preferred to employ high energy electrons, such as are produced from high voltage linear accelerators as the source of the ionizing radiation, but other types of ionizing particle radiation and ionizing electromagnetic radiation can also be utilized, including, for example, neutron radiation, gamma rays, X-rays, etc. Such radiation can be produced from an atomic pile or other radioactive source, by bombardment of a metal target with electrons or with high energy positive particles, or from sources such as a betatron, cyclotron, and the like.

These compositions are also curable by subjecting them to actinic light, such as ultraviolet radiation. There are generally employed light sources which provide wave lengths between about 1800 and about 4000 Angstroms; suitable sources include quartz mercury lamps, ultraviolet cored carbon arcs, high flash lamps, and others of the various types known to the art.

The level of radiation necessary to cure the B-stage polyurethanes varies with the particular materials, the thickness of the layer, and, to some extent, with the substrate, environmental conditions, etc. Using ionizing radiation, it is usually best to subject the material to at least about 0.5 megarad of radiation; usually not more than about 1 and about 5 megarads.

The length of exposure to actinic light also varies, but is sufficient to cure the coating. As little as a few seconds and up to several minutes can be used in some cases, but in general the composition is not exposed for more than 10 to 15 seconds. Ordinarily, actinic light is not employed when the composition contains appreciable amounts of materials, such as certain pigments, which absorb in this region.

When it is desired to cure using actinic light, it is often desirable to include in the composition a photosensitizer for the actinic light employed. These are known in the art and include compounds such as benzoin, benzoin methyl ether, diphenyl disulfide, benzil and the like. When a photosensitizer is used, the amount is usually a matter of choice and is usually between about 0.1 percent and about 5 percent of the over-all composition.

As indicated, the polyurethane composition is irradiated as a thin layer. By a thin layer is meant a layer of a thickness not exceeding about 30 mils. The preferred layers are from about 0.5 to about 10 mils thick. Such layers are produced, for example, by rolling or calendering the B-stage polyurethane, by flowing or casting the liquid polyurethane or the components thereof onto a substrate or carrier web, by coating a solution of the polyurethane or the polyurethane-forming components onto a substrate and then evaporating the solvent, or by similar techniques. The thin layer can be formed just prior to the irradiation or it can be first produced and then subjected to irradiation at a later time.

It is generally preferable to utilize the polyurethane either along or in admixture with a non-volatile copolymerizable radiation-sensitive material. The use of substantial amounts of relatively volatile materials such as monoethylenically unsaturated monomers with the polyurethane presents problems of toxicity and decreased efficiency because of volatilization, which not only results in decreased film thickness and loss of materials but also interferes with the source of radiation (e.g., by producing fumes which block the path of the ultraviolet light or electron beam). Thus, while in many cases it may be desirable to include with the B-stage polyurethane a small amount of one or more copolymerizable ethylenically unsaturated materials which serve as a reactive diluent, when a volatile monoethylenically unsaturated monomer is used there is ordinarily employed not more than about 25 percent based on the total weight of the mixture of such monomers.

The preferred materials of this type are vinyl aromatic hydrocarbons, such as styrene, vinyl toluene and alpha-methyl styrene, and alkyl esters of acrylic acid, and especially lower alkyl acrylates such as ethyl acrylate, butyl acrylate, 2-ethylhexyl acrylate, and others having up to about 8 carbon atoms in the alkyl group. Other useful acrylic monomers are decyl acrylate, 2-hydroxyethyl acrylate, 2-hydroxypropyl acrylate, ethylene glycol diacrylate, glycerol triacrylate, glycerol diacrylate, glycidyl acrylate, iminoethyl acrylate, and dimethylaminoethyl acrylate. The corresponding methacrylic acid esters can also be employed, but are usually less desirable than the acrylates. Other monoethylenically unsaturated monomers which can be copolymerized using radiation include vinyl esters, such as vinyl acetate, vinyl propionate, and vinyl butyrate, vinyloxyethanol, vinyloxyethylamine, acrylic acid, methacrylic acid, N-butoxymethyl acrylamine, and similar monomers. It is desirable to employ monomers which are liquid at the conditions of use; this is especially true when the B-stage polyurethane is a solid or highly viscous material and it is desired to flow or cast it in a thin layer. In many cases, the added monomer serves as a solvent, and is added as needed to adjust viscosity.

For some purposes it is desirable to include as an additional component a radiation-sensitive polyunsaturated material. These tend to be of higher molecular weight and thus present fewer problems, and as a consequence somewhat higher proportions can be used, i.e. up to about 50 percent of the total weight. The preferred materials of this type are polyvinyl compounds (monomers, telomers, oligomers) having 2 or 3 vinyl ($CH_2=CH-$) groups, such as divinyl benzene, trivinyl benzene, ethylene glycol diacrylate, and similar monomers, but more preferably more complex monomers, telomers and oligomers in which vinyl groups (e.g. acrylyl groups) are attached to polyester, polyamide or other moieties. Materials of this type are described, for example, in U.S. Pat. Nos. 3,455,801; 3,471,386; 3,485,732; 3,483,105; 3,616,364; 3,645,984; and 3,619,260. Among the preferred polyvinyl materials for use herein are acryloxypivalyl acryloxypivalate (and others as described in U.S. Pat. No. 3,645,984).

The irradiation is carried out using essentially conventional procedures. Single or multiple beams of electrons, actinic light, or other sources of radiation can be employed, and the polyurethane layer can be treated either continuously or in a batch process. Usually the layer of polyurethane is carried through the path of the radiation on a belt or similar conveying means, and either a single or several passes can be used to provide the desired total dose. It is often desirable to carry out the irradiation with the polyurethane in an alert environment, from which oxygen has been substantially excluded. Inert gases such as nitrogen or argon can be used for this purpose.

In addition to the polyurethane and any copolymerizable monomers, the composition to be cured can also include other additive materials, such as pigments, which are conventionally included in products of the type desired to be produced.

The cured product can be a free film, in which case it is usually irradiated on a carrier web from which it can be stripped after curing, or it can be a coating or used to form an impregnated material. Coatings are produced by curing the polyurethane while on a substrate to which it is or can be adhered; such substrates can be metals, for example, steel, aluminum, tin and copper, or wood, plastics, glass, paper, leather, asbestos or the like. Since the entire process can be carried out at essentially room temperature, if desired, the substrate need not be able to withstand elevated temperatures and there is virtually no limitation upon the types of substrates which can be employed. Impregnated materials are produced by impregnating a fibrous or porous material with the B-stage polyurethane composition and curing to produce a cured, reinforced product. Fibers or fabrics of glass, cotton, wool, asbestos, or various other natural or synthetic materials can be used, as can many cellulosic and other papers, wood, wood particles, etc.

Set forth below are several examples which serve to illustrate the invention in certain of its embodiments. All parts and percentages in the examples (and throughout the specification) are by weight unless otherwise indicated. Where toluene diisocyanate is used, the ordinary commercial product, containing about 80 percent of the 2,4-isomer and about 20 percent of the 2,6-isomer, was employed.

EXAMPLE 1

The following were mixed together at room temperature:

|  | Parts by Weight |
| --- | --- |
| Polyester polyol* | 51.3 |
| Toluene diisocyanate | 18.1 |
| 2-Hydroxyethyl acrylate | 13.7 |
| Butyl acrylate | 17.2 |
| Hydroquinone | 0.14 |

*Made from 42.3 parts of neopentyl glycol, 24.1 parts of adipic acid, 7.4 parts of trimethylylpropane, and 41.1 parts of isophthalic acid; OH value 84.3.

After 24 hours, a clear, resinous B-state product was obtained. A layer of this product, 1.5 mils thick, was drawn on an aluminum substrate, blanketed with nitrogen gas and subjected to ionizing radiation from an electron accelerator (ICT 500, manufactured by High Voltage Engineering Corporation) at 375 kilovolts, 14 milliamps, using a 1 inch by 22 inch scan. The total dose was 5 megarads. A clear, hard, cured adherent coating was obtained, having a pencil hardness of H, good solvent and stain resistance, good adhesin and a high degree of resistance to both acid and caustic solutions.

EXAMPLE 2

In this example there was employed a polyester polyol known as "PCP 0200", which is understood to be produced from caprolactone and diethylene glycol and has a molecular weight of about 530 and a hydroxyl value of about 212.

The following were mixed at room temperature:

|  | Parts by Weight |
| --- | --- |
| Polyester polyol ("PCP 0200") | 10.6 |
| 2-Hydroxyethyl acrylate | 5.1 |
| Acryloxypivalyl acryloxypivalate | 5.0 |
| Dibutyl tin dilaurate | 0.16 |

To this mixture there was added 6.8 parts of hexamethylene diisocyanate over a 10-minute period with stirring and cooling to keep the temperature below about 35° C. The mixture was then heated to 50° C. for 2 hours, after which no isocyanate groups remained by infrared analysis. To this product there was added a solution of 0.002 part of benzoin in 5 parts of acryloxypivalyl acryloxypivalate (serving as a reactive diluent). This mixture was then applied as a 3-mil film to a steel panel and subjected to actinic light from a 330 watt/inch mercury ultraviolet lamp by passing the panel under the lamp twice at a speed of 50 feet per minute. A hard, cured, adherent coating was obtained.

EXAMPLES 3-7

In these examples, there was utilized a polyester polyol made from the following:

|  | Parts by Weight |
| --- | --- |
| Poly(oxytetramethylene) glycol (molecular weight 1000) | 3750 |
| Neopentyl glycol | 4875 |
| Adipic acid | 3014 |
| Trimethylolpropane | 921 |
| Isophthalic acid | 5132 |

This product had a hydroxyl value of 59, and was used to produce B-stage polyurethanes by heating each of the following mixtures at 70° C. for 5 hours (quantities in parts by weight):

|  | Example | | | | |
|---|---|---|---|---|---|
|  | 3 | 4 | 5 | 6 | 7 |
| Polyester polyol | 162 | 162 | 81 | 81 | 81 |
| Toluene diisocyanate | 28.2 | 42 | 28.2 | 42.2 | 84.4 |
| 2-Hydroxyethyl acrylate | 28.8 | 50.6 | 18.8 | 24.4 | 56.8 |
| Ethyl acrylate | 18 | 18 | 19 | 19 | 19 |
| Hydroquinone | 0.4 | 0.4 | 0.2 | 0.2 | 0.2 |

Films of the above products, cured as described previously, each provided hard, adherent coatings having good properties.

EXAMPLE 8

In this example a phosphorus-containing polyol resin was employed having the following composition:

|  | Parts by Weight |
|---|---|
| Maleic anhydride | 546 |
| Sorbitol | 294 |
| Trichlorophosphite | 936 |
| Acid value — 9 | |
| OH value — 381 | |
| Percent phosphorus — 5.25 | |

A curable polyurethane was produced by reacting 58.2 parts of the above resin, 69.6 parts of 2-hydroxyethyl acrylate and 67 parts of toluene diisocyanate at room temperature for 24 hours (in the presence of 0.25 part of hydroquinone). It cured to a hard, adherent coating at a film thickness of 1–2 mils, using a total dose of 5 megarads.

EXAMPLES 9–11

A phosphorus-containing polyester polyol was produced by reacting one mole of $P_2O_5$, one mole of butanol and sufficient propylene oxide to neutralize. The product, having OH value of 215–260, was used to produce curable polyurethanes from the following (in parts by weight):

|  | Example | | |
|---|---|---|---|
|  | 9 | 10 | 11 |
| Phosphorus polyol | 96 | 72 | 48 |
| 2-Hydroxypropyl acrylate | 42 | 55 | 68 |
| Toluene diisocyanate | 69.6 | 69.6 | 69.6 |
| Hydroquinone | 0.25 | 0.25 | 0.25 |

When cured with ionizing radiation as described above, each of the above products produced films of good properties.

EXAMPLE 12

An acrylyl-terminated polyester polyol was produced from 296 parts of phthalic anhydride, 232 parts of 2-hydroxyethyl acrylate and 128 parts of ethylene oxide; it has the formula:

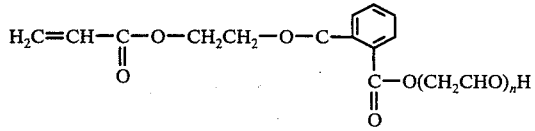

where $n$ is 1–2. A mixture of 75 parts of this polyester and 30 parts of toluene diisocyanate in 30 parts of butyl acrylate were reacted at room temperature for 24 hours. A 1–2 thick film of the resultant product was cured at a total dose of 5 megarads. The cured product had good properties.

EXAMPLES 13–14

In this example, there was employed the hydroxy ester of acrylic acid produced by reacting the diglycidyl ether of Bisphenol A and acrylic acid, having the following theoretical formula:

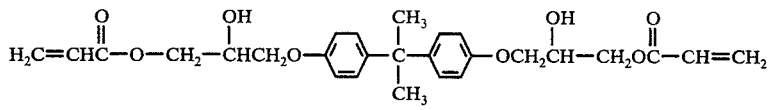

Using this product, curable polyurethanes were produced from the following (in parts by weight):

|  | Example | |
|---|---|---|
|  | 13 | 14 |
| Acrylyl-terminated product above | 48 | 48 |
| Polyester polyol described in Example 12 | 60 | 60 |
| Toluene diisocyanate | 51.4 | 35.6 |
| Butyl acrylate | 37 | 37 |
| Poly(oxytetramethylene) glycol (molecular weight 1000) | 100 | — |

Each product when cured as described above produced useful films.

EXAMPLES 15–16

An unsaturated polyester polyol was produced from the following:

|  | Parts by Weight |
|---|---|
| Neopentyl glycol | 10.9 |
| Isophthalic acid | 5.0 |
| Maleic anhydride | 5.0 |

This polyester (75 parts) was mixed with 25 parts of styrene, 0.17 part of trimethylbenzylammonium chloride and 0.01 part of hydroquinone. This polyester resin mixture was used to produce curable polyurethanes, which were cured as in the above examples, and produce coatings and impregnated glass fiber articles of satisfactory properties. The polyurethane compositions were as follows (in parts by weight):

| Example: | 15 | 16 |
|---|---|---|
| Polyester resin mixture | 100 | 100 |
| Toluene diisocyanate | 10 | 5 |
| Hydroxyethyl acrylate | 5 | 5 |
| Prepolymer* | — | 15 |
| Butyl acrylate | 15 | 20 |

*Made from poly(oxytetramethylene) glycol (molecular weight 954) and toluene diisocyanate, having a molecular weight of about 1320 and an —NCO content of about 6.4 percent.

In a manner similar to the proceding examples, there are produced cured products using the other types of B-stage polyurethanes as described above. Also, other types of ionizing radiation and actinic light and varying dose rates can be substituted for those described in the examples, in accordance with procedures known in the art.

According to the provisions of the patent statutes, there are described above the invention and what are now considered to be its best embodiments. However, within the scope of the appended claims, it is to be understood that the invention can be practiced otherwise than as specifically described.

I claim:

1. A method of producing a cured polyurethane which comprises subjecting a layer of a curable polyurethane composition to ionizing radiation or actinic light sufficient to cure said layer, said curable polyurethane composition consisting essentially of
A. the reaction product of
   a. a polyester polyol,
   b. an organic isocyanate, and
   c. a hydroxyl-containing ester having a terminal acrylyl or alpha-substituted acrylyl group,
   wherein the number of isocyanate groups of the reactants is not greater than the number of hydroxyl groups of the reactants; and
B. up to 25 percent based on the total weight of (A) and (B) of a radiation-sensitive monoethylenically unsaturated monomer.

2. The method of claim 1 in which said hydroxyl-containing ester is a hydroxyalkyl ester of an acrylic acid.

3. The method of claim 1 in which said diisocyanate is an isocyanato-terminated adduct of a polyether polyol or a polyester polyol.

4. The method of claim 1 in which said diisocyanate is toluene diisocyanate.

5. The method of claim 1 in which said monomer is selected from the group consisting of vinyl aromatic hydrocarbons, esters of acrylic acid and mixtures thereof.

6. The method of claim 1 in which said layer is subjected to from about 0.5 to about 10 megarads of high energy ionizing radiation.

7. The method of claim 1 in which said hydroxyl-containing ester is derived by reacting acrylic or methacrylic acid with an epoxy compound.

8. The method of claim 1 in which said polyester polyol is a phosphorus-containing polyol.

9. The method of claim 1 wherein said polyurethane composition also contains acryloxypivalyl acryloxypivalate.

10. The method of claim 1 wherein said polyester polyol is a polylactone polyol.

11. The method of claim 1 wherein said polyester polyol is a polycaprolactone polyol.

* * * * *